United States Patent [19]

Dean et al.

[11] Patent Number: 5,077,880
[45] Date of Patent: Jan. 7, 1992

[54] TOOL FOR CLOSING OPTICAL CONNECTORS HAVING LOCKING RINGS

[75] Inventors: David L. Dean, Hickory; Johnny W. Beatty, Maiden, both of N.C.

[73] Assignee: Siecor Corporation, Hickory, N.C.

[21] Appl. No.: 632,095

[22] Filed: Dec. 21, 1990

[51] Int. Cl.⁵ .......................................... B25B 27/14
[52] U.S. Cl. ................................. 29/281.5; 29/240; 29/281.1
[58] Field of Search ............... 29/240, 267, 270, 278, 29/281.1, 281.4, 281.5

[56] References Cited

U.S. PATENT DOCUMENTS

| | | | |
|---|---|---|---|
| 2,836,883 | 6/1958 | Puck | 29/281.5 |
| 3,431,623 | 3/1969 | Smeets | 29/240 |
| 3,658,231 | 4/1972 | Gilman | 29/281.5 |
| 3,772,753 | 11/1973 | Sargeant | 29/281.4 |
| 3,800,388 | 4/1974 | Börner et al. | 29/281.5 |
| 3,828,413 | 8/1974 | Province et al. | 29/281.4 |
| 4,755,018 | 7/1988 | Heng et al. | 350/96.21 |
| 4,899,430 | 2/1990 | Farino | 29/240 |
| 4,923,274 | 5/1990 | Dean | 350/96.21 |

Primary Examiner—J. J. Hartman
Attorney, Agent, or Firm—J. David Abernethy

[57] ABSTRACT

Disclosed is a tool for closing optical connectors having external rotatable locking rings. Opposing optical fiber clamps are mounted to a base, and a frame is mounted to the base between the clamps. Levers rotate tubes to close the locking rings while the clamps hold optical fibers in their proper position.

4 Claims, 5 Drawing Sheets

TOOL FOR CLOSING OPTICAL CONNECTORS HAVING LOCKING RINGS

BACKGROUND OF THE INVENTION

The field of the invention is tools for operating optical connectors.

Optical connectors having two external rotatable locking rings are described in U.S. Pat. Nos. 4,755,018, and 4,923,274. To operate such connectors, the technician must move both cams to their open position, insert an optical fiber in each connector end so that the fibers touch in the middle of the connector, and move both cams to their closed position while maintaining the proper fiber position. Errors which might arise, particularly under unfavorable field conditions, include not initially moving cams to the open position, not entering the optical fibers in abutting relation, and not properly maintaining the proper position of the optical fibers when the cams are closed. A need therefore exists for a tool to simplify the use of such connectors in the field.

SUMMARY OF THE INVENTION

The invention is a tool for closing an optical connector having two external rotatable locking rings. Optical fiber clamps are mounted on opposing ends of a base, and a frame is mounted to the base between the first and second optical fiber clamps. Since the locking rings of the particular connector for which the tool is designed have square outer surfaces, rotatable tubes having square inner surfaces are mounted in the frame to receive the connector. Each tube has a lever to rotate the tubes from a first position in which the locking rings are open to a second position in which the locking rings are closed. Since optical fibers will now be inserted, endwise removal may not be possible, so sidewall channels are formed in the tube sidewalls to allow removal of the connector when the rotatable tubes are in the second position. A mechanical stop on the frame prevents insertion of the connector beyond the optimal centered position. Further, a marker on the base indicates the length of buffer tube to be stripped from an optical fiber prior to its insertion into the optical connector.

BRIEF DESCRIPTION OF THE DRAWINGS

The preferred embodiment of the invention is described with respect to the drawings, all of which are perspective views, in which.

DETAILED DESCRIPTION OF THE PREFERRED EMBODIMENT

Figure 1:
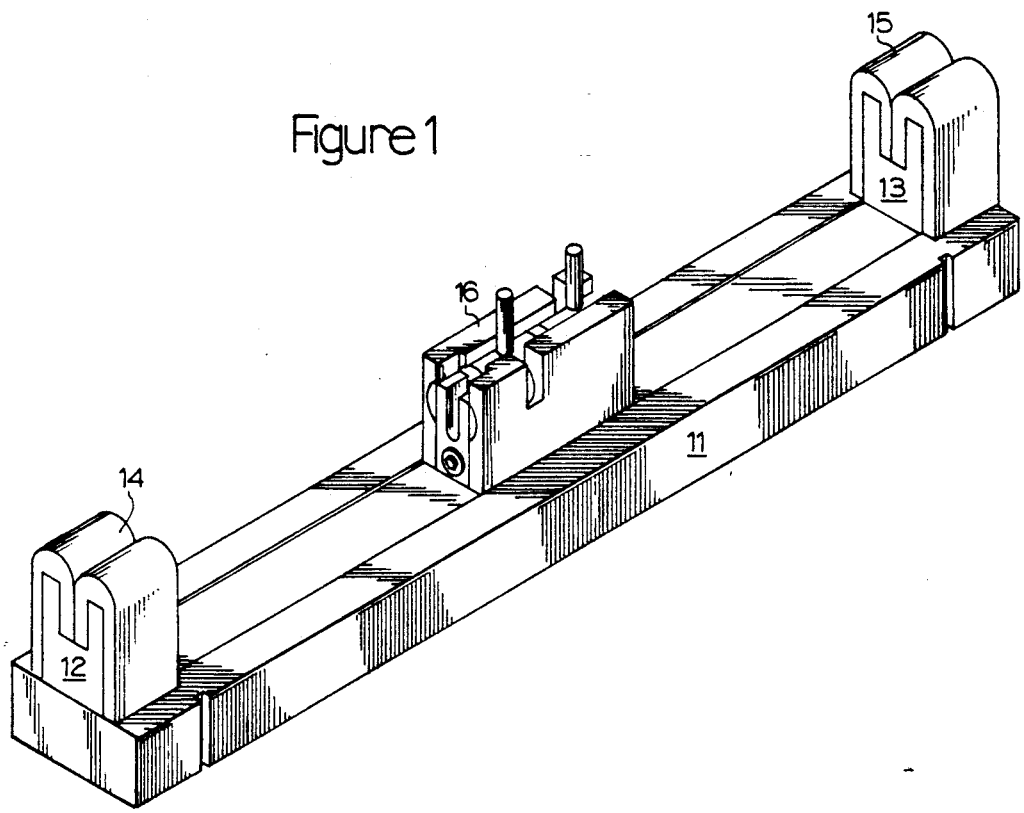
FIG. 1 is a view of the tool.

Shown in FIG. 1 is rectangular base 11 with optical fiber clamp frames 12, 13 mounted on opposing ends of base 11 and frame 16 mounted between clamp frames 12, 13. Base 11, clamp frames 12, 13, and frame 16 are all formed from a rigid metal such as steel. Clamp frames 12, 13, and frame 16 are mounted to base 11 by screws.

Figure 2:
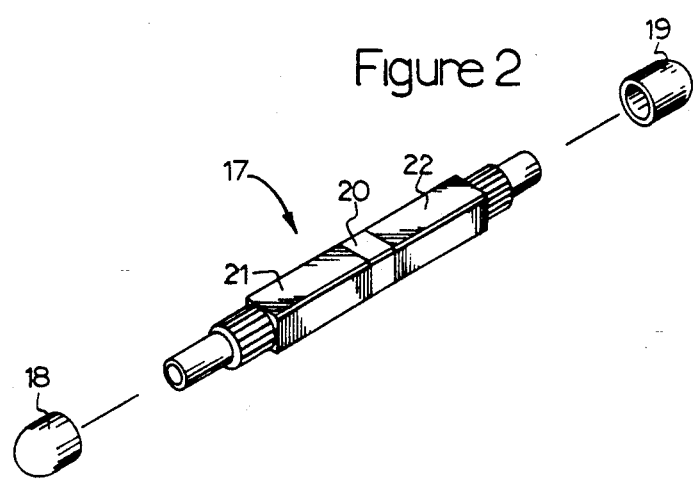
FIG. 2 is a view of the optical connector.

Shown in FIG. 2 is optical connector 17 having counter-rotating rings 21, 22 thereon. Rotation of rings 21, 22 from their open to their closed positions centers optical fibers as shown in U.S. Pat. No. 4,923,274 inserted therein for a proper optical connection. Center piece 20 does not rotate. End caps 18, 19 are removed prior to use.

Figure 3:
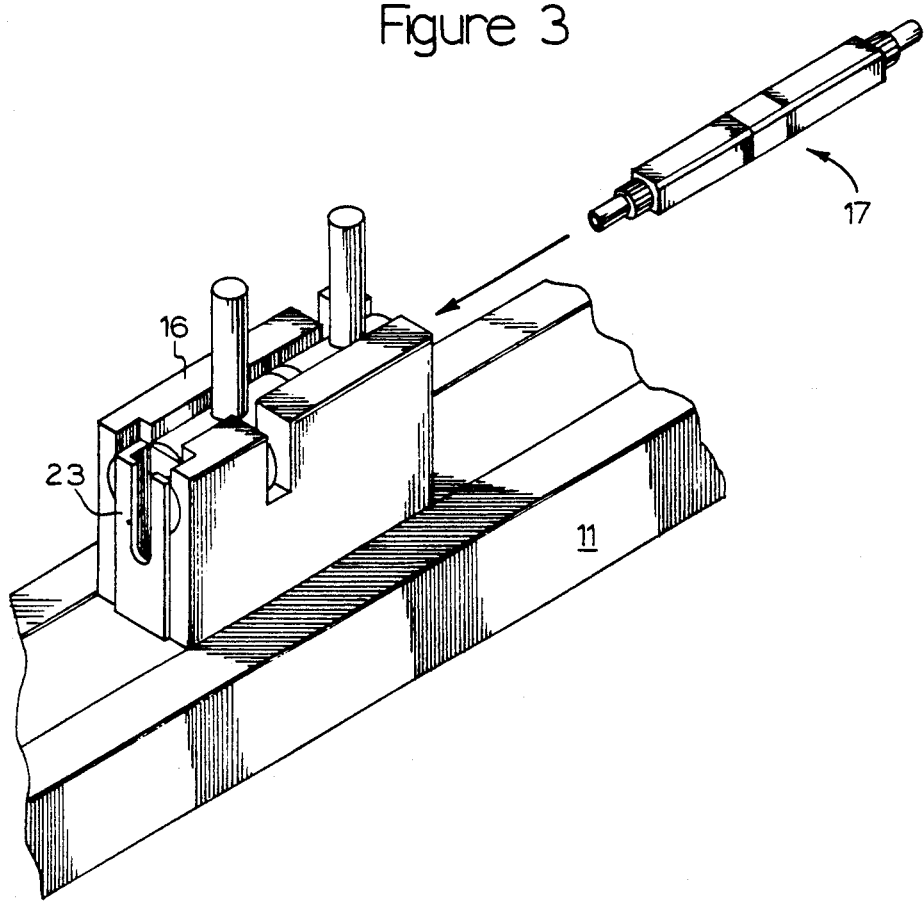
FIG. 3 is a view of the optical connector positioned for insertion into the tool.
Figure 4:
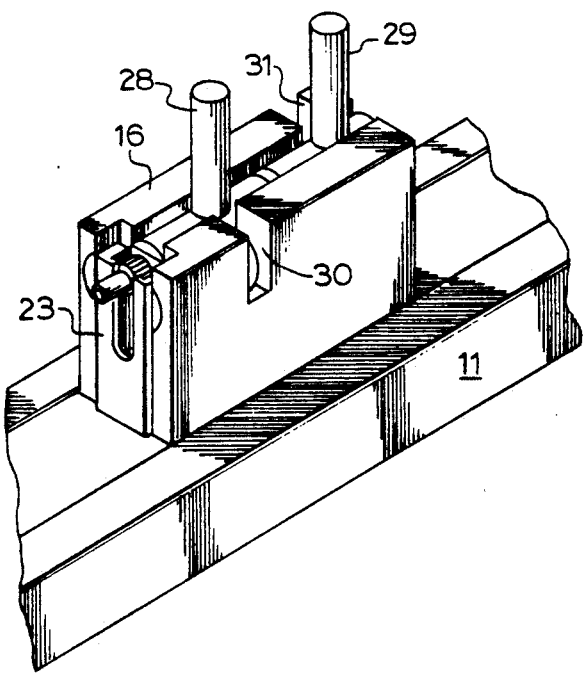
FIG. 4 is a view of the tool with the connector inserted therein.
Figure 10:
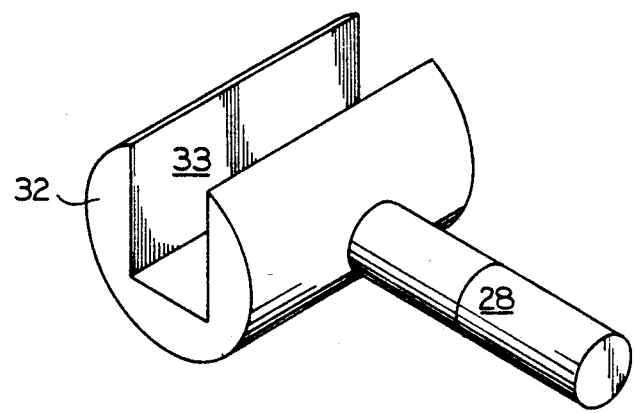
FIG. 10 is a view of a tool rotatable tube having a lever mounted thereto.

Inserted in frame 16 are first and second rotatable tubes having levers 28, 29 attached thereto. As shown in FIG. 10, first rotatable tube 32 has a sidewall channel 33 communicating with its inner surface, which is square to fit rings 21, 22. Channel 33 is cut with a ball end mill. As shown in FIGS. 3 and 4, optical connector 17 is inserted in its open position into frame 16 from one side until U-shaped mechanical stop 23 is reached, at which point locking rings 21 22 are within the rotatable tubes such as tube 32. The other rotatable tube has the same shape as tube 32, with the exception that lever 29 would be mounted to the left, opposite the position of lever 28 in FIG. 10. Frame 16 has slots 30, 31 cut to accommodate movement of levers 28, 29.

Figure 5:
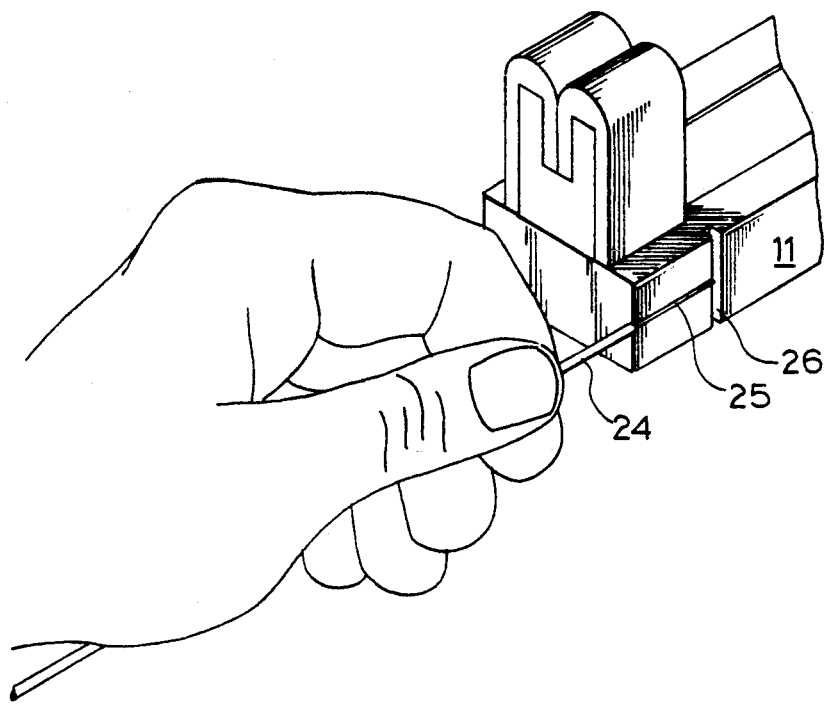
FIG. 5 is a view of an optical fiber being measured for the length of buffer tube to be removed.
Figure 6:
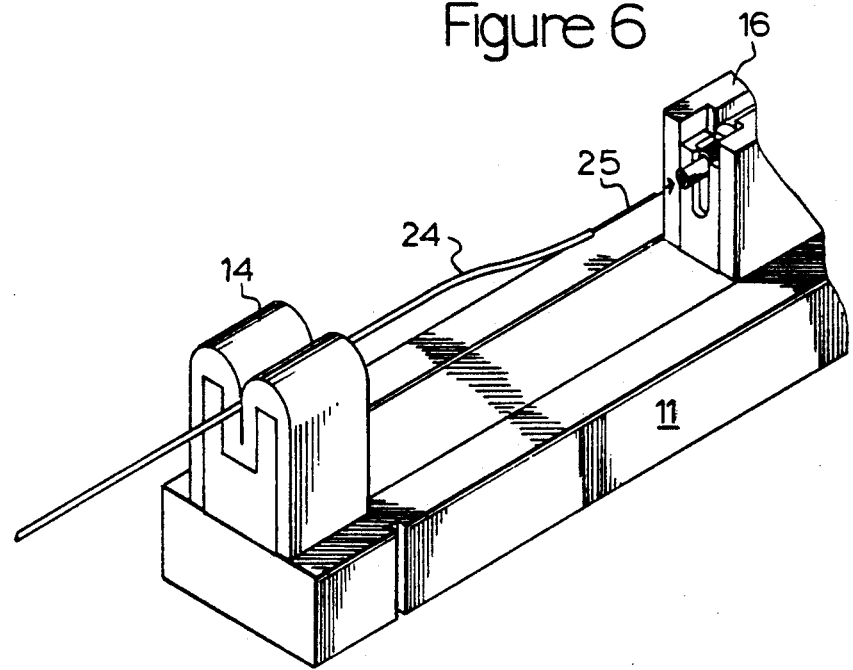
FIG. 6 is a view of an optical fiber positioned for insertion into the optical connector.
Figure 7:
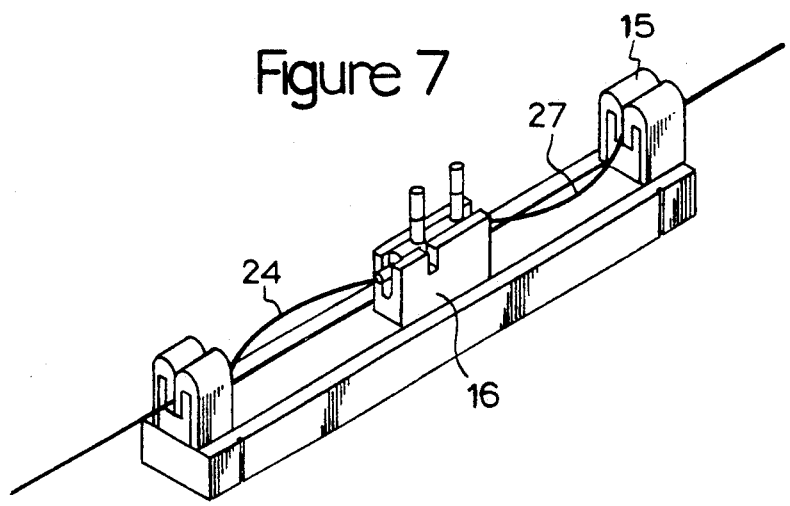
FIG. 7 is a view of two optical connectors inserted into the tool in its open position.
Figure 8:
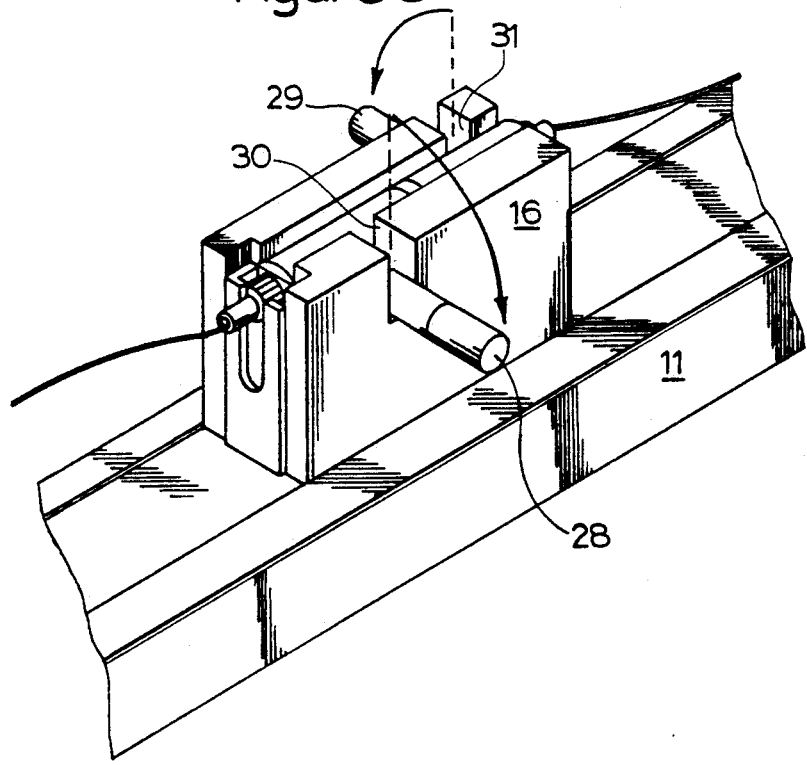
FIG. 8 is a view of the frame with the levers turned to move the optical connector to its closed position.
Figure 9:
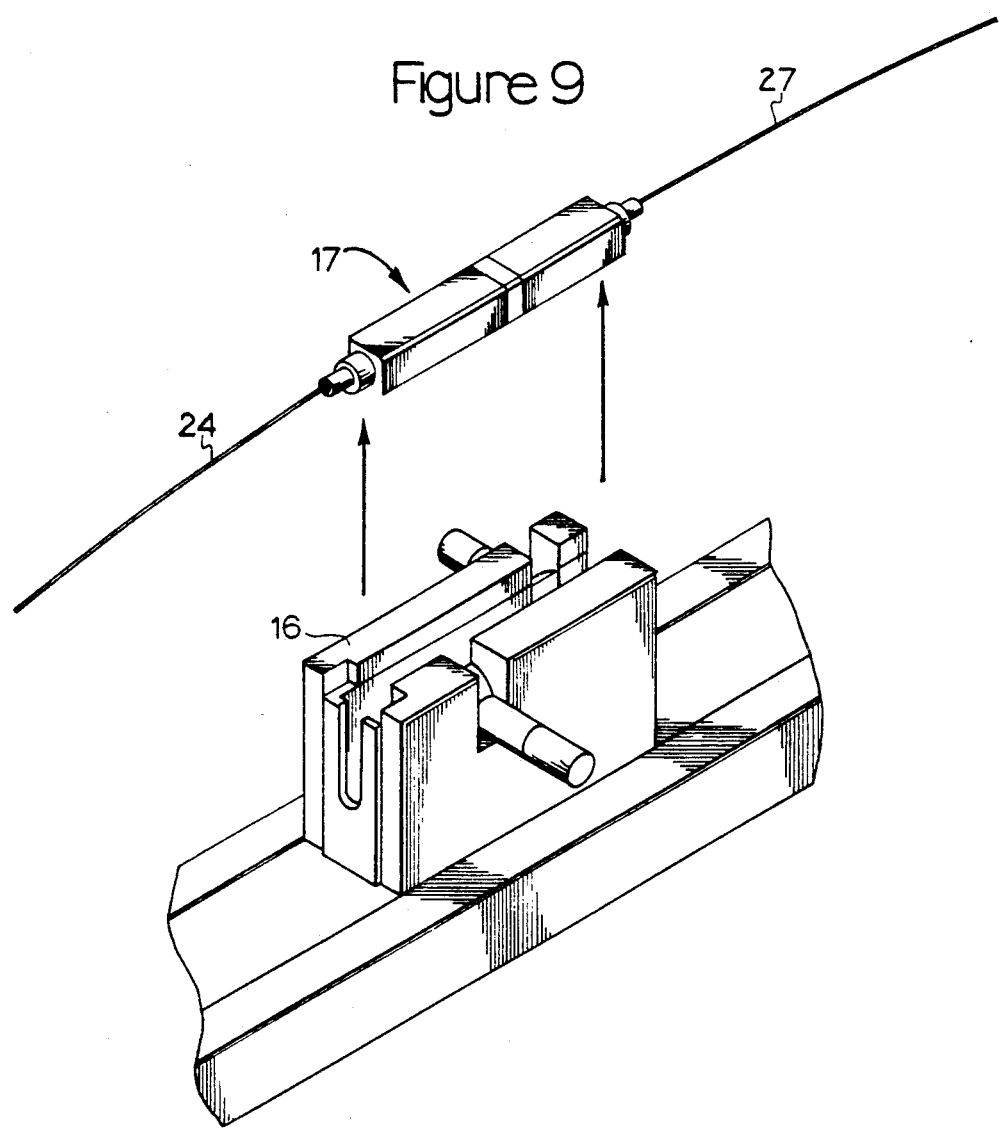
FIG. 9 is a view of the completed connector assembly being removed from the tool.

As shown in FIGS. 5 and 6, optical fiber 25 to be connected is contained in buffer tube 24. Marker 26 indicates the distance from the tool corner to which the buffer tube and fiber coating should be stripped from optical fiber 25. This distance is set as 14 mm. Buffer tube 24 is then held by optical fiber clamp 14, which is an adhesive backed foam strip with backing secured to clamp frame 12. Backed foam strip 15 is similarly secured to clamp frame 13. After optical fiber 25 has been inserted into one end of optical connector 17, the second buffer tube 27 is secured by foam strip 15 and inserted into the other end of optical connector 17 until equal bends in both buffer tubes 24, 27 are observed. Levers 28, 29 are then rotated downward to rotate the rotatable tubes to their second position, closing locking rings 21, 22. The completed connector and optical fibers may then be removed through channels 33, as shown in FIG. 9.

What is claimed is:

1. A tool for closing an optical connector having two external oppositely rotatable locking rings, comprising:
    (a) a base;
    (b) first and second optical fiber clamps mounted to the base;
    (c) a frame mounted to the base between the first and second optical fiber clamps; and,
    (d) means for locating said locking rings including first and second rotatable tubes mounted in the frame for receiving the optical connector along the longitudinal axis of said tubes, each rotatable tube having a channel in its sidewall, each rotatable tube enclosing one of said locking rings, whereby the tubes are oppositely rotatable from a first position, in which the locking rings are open, and the tube channels are not aligned to a second position, in which the locking rings are closed and the tube channels are aligned to allow the optical connector or optical fibers mounted thereto to be removed in a manner transverse to said longitudinal axis.

2. A tool as recited in claim 1, further comprising a lever mounted to each of the first and second rotatable tubes to assist in tube rotation.

3. A tool as recited in claim 1, further comprising a mechanical stop on the frame preventing insertion of the optical connector within the rotatable tubes beyond a position wherein the rotatable connector locking rings are within the rotatable tubes of the tool.

4. A tool as recited in claim 1, further comprising a marker on the base indicating the length of buffer tube to be stripped from an optical fiber prior to its insertion into the optical connector.

* * * * *

UNITED STATES PATENT AND TRADEMARK OFFICE
CERTIFICATE OF CORRECTION

PATENT NO. : 5,077,880

DATED : Jan. 7, 1992

INVENTOR(S) : Dean, et al.

It is certified that error appears in the above-identified patent and that said Letters Patent is hereby corrected as shown below:

In column 2, line 17, delete "Inserted" and substitute
-- Mounted --.

In the eighth line of Claim 1, otherwise known as Column 2, line 58, delete "locating" and substitute -- rotating --.

Signed and Sealed this

Fourth Day of May, 1993

Attest:

MICHAEL K. KIRK

Attesting Officer

Acting Commissioner of Patents and Trademarks